3,462,470
LIQUID POLYISOCYANATE COMPOSITIONS AND PROCESS FOR THE MANUFACTURE THEREOF
Ernest W. Emery, Eggertsville, and Voldemar Kirss, Buffalo, N.Y., assignors to Allied Chemical Corporation, New York, N.Y., a corporation of New York
No Drawing. Filed June 21, 1965, Ser. No. 465,751
Int. Cl. C07c *119/04;* C08g *22/28, 22/48*
U.S. Cl. 260—453                             11 Claims

ABSTRACT OF THE DISCLOSURE

Liquid polyisocyanate compositions which do not undergo a rapid increase in viscosity and do not deposit solids on storage derived from organic polyisocyanates and aromatic diamines.

---

Toluene diamine phosgenation products comprising tolylene diisocyanate solutions of congeneric non-volatile polyisocyanate solutes, said solutes having a functionality in excess of two isocyanate groups for each mole of solute, said tolylene diisocyanate solutions having amine equivalents between about 90 and 125 and viscosities between about 20 and about 10,000 are commercially well-known products finding utility in the polyurethane field. Such products are referred to by Ferrigno in Rigid Plastic Foams, Reinhold Publishing Corp., 1963, at pages 5 to 10.

Toluene diamine phosgenation products having an amine equivalent between about 98 and about 120 are exemplified and disclosed in French Patent 1,375,975, wherein toluene diamine phosgenation products are prepared by reacting a mixture of toluene diamines obtained by the reduction of the dinitration product of toluene with phosgene in the presence of a solvent and then distilling solvent and tolylene diisocyanates from the phosgenation mixtures until the distilland is composed of a toluene diamine phosgenation product comprising a tolylene diisocyanate solution of congeneric non-volatile polyisocyanate solutes, said solution having an amine equivalent between about 98 and about 120 and a viscosity in the range of about 20 to about 10,000 cps. Such solutions may be converted by known one-shot foaming procedures to rigid polyurethane foams having highly desirable physical and chemical properties. The processes whereby these tolylene diisocyanate solutions are produced are disadvantageous in that the achievement of a distilland having a viscosity in the range of 20 to 10,000 cps. and an amine equivalent in the range of about 98 to about 120, useful in the manufacture of rigid urethane foam polymers often requires the distillation from the original solvent-free toluene diamine phosgenation mixture of a monomeric tolylene diisocyanate fraction equal to about 50% or more of the phosgenation mass, thereby diminishing the effective capacity of the phosgenation apparatus for producing the desired distillant. Undistilled tolylene diamine phosgenation products prepared by atmospheric pressure phosgenation processes usually are unstable with respect to viscosity increases and sediment depositions during storage. The present process yields polyisocyanate compositions which are relatively stable with respect to viscosity increase and solids deposition on storage.

It is therefore a principal object of our invention to provide novel polyisocyanate compositions useful in the manufacture of urethane foams by one-shot foaming procedures and a process for the manufacture thereof.

It is another object of our invention to provide novel liquid polyisocyanate compositions derived from tolylene diisocyanates, having a viscosity between about 20 and about 10,000 cps. at 25° C. and an amine equivalent between about 98 and 120, which, on storage, do not undergo a rapid increase in viscosity and do not deposit solid masses.

These and other objects of our invention will become obvious from the following detailed description thereof.

We have discovered that novel liquid polyisocyanate compositions derived from tolylene diisocyanates and suitable in the manufacture of urethane foams by one-shot foaming procedures, having a viscosity in the range of about 20 to 10,000 and preferaby about 30 to 250 cps. at 25° C. and an amine equivalent of 90 to 125 and preferably 100 to 115, which do not exhibit a rapid increase in their viscosity and do not deposit solid sediments on prolonged storage can be prepared by treating tolylene diisocyanate mixtures or isocyanate mixtures in which tolylene diisocyanates are the major components, with small amounts, generally from about 0.5 to 8.5% by weight, of an aromatic diamine, at a temperature of 150 to 200° C. for a period of 1 to 5 hours.

Our new process permits the preparation of novel polyisocyanate compositions derived from organic diisocyanates, in a novel and efficient manner, in that our process essentially eliminates the necessity of distilling from crude phosgenation mixtures any of the monomeric organic diisocyanate components. The yield of the desired polyisocyanate composition, based on the organic diamine phosgenation charge, is limited only by the efficiency of the phosgenation process.

In carrying out the process of our invention, an organic diamine preferably an aromatic diamine, for example a toluene diamine, a phenylene diamine, methylenedianiline and the like, is added to an undistilled phosgenation mixture, for example as obtained by the phosgenation of toluene diamine mixtures by methods well-known in the art, such as described in U.S.P. 2,908,703. Such an undistilled phosgenation mixture may constitute the reaction product of a toluene diamine or a toluene diamine mixture with phosgene, which product may or may not contain a diluent and from which none or a portion of the tolylene diisocyanate component corresponding to the original diamine may have been removed by distillation. Alternately, an organic diamine as described above, may be added to a mixture of 2,4- and 2,6-tolylene diisocyanates abtained by fractional distillation of the above-mentioned toluene diamine phosgenation product. Whenever desirable, diamines as described above may be added to pure 2,4-tolylene diisocyanate or 2,6-tolylene diisocyanate obtained by separation of an isomeric mixture of the same, for example, as described in U.S.P. 3,022,328. Whenever purified tolylene diisocyanates or tolylene diisocyanate mixtures are employed in the process of our invention, polyisocyanate compositions are obtained which yield cellular urethane foams having physical and chemical properties similar to the properties of urethane polymers derived from polyisocyanate compositions obtained by the process of our invention from undistilled tolylene diamine phosgenation residues except that, in the former case whiter or lighter colored foams are obtained than in the latter case, due to the presence, in undistilled toluene diamine phosgenation mixtures, of certain dark-colored impurities which cause discoloration of the cellular urethane foams obtained.

The process of our invention is not restricted to tolylene diisocyanates or mixtures thereof. Examples of other diisocyanates useful in the process of our invention are: phenylene diisocyanates such as o-phenylene diisocyanate, m-phenylene diisocyanate and p-phenylene diisocyanate, other alkyl phenylene diisocyanates such as 2,4-tolylene diisocyanate, 3,5-tolylene diisocyanate, 2,4-diisocyanato ethylbenzene and 2,4-diisocyanato isopropylbenzene, other phenylene diisocyanates such as 1-chlorophenylene-2,4-diisocyanate and 1 - nitrophenylene-3,5-diisocyanate, diphenyl ether derivatives such as 4,4'-diisocyanato diphenyl ether, 3,3'-dimethyl-4,4'-diisocyanato diphenyl ether and 3,3'-dichloro-4,4'-diisocyanato diphenyl ether, diphenylmethane derivatives such as 4,4'-diisocyanato-diphenylmethane and 3,3'-dichloro-4,4'-diisocyanato diphenylmethane, 4,4'-biphenylylene diisocyanate, 1,2-naphthylene diisocyanate, 4-chloro-1,2-naphthylene diisocyanate, 4-methyl-1,2-naphthylene diisocyanate, 1,3-naphthylene diisocyanate, 1,4-naphthylene diisocyanate, 1,5-naphthylene diisocyanate, 1,6-naphthylene diisocyanate, 2,3-naphthylene diisocyanate, 2,7-naphthylene diisocyanate, 1-methyl-2,4-naphthylene diisocyanate, 7-methyl-1,3-naphthylene diisocyanate, 1,3-cyclohexane diisocyanate, 1,4-cyclohexane diisocyanate, 4,4'-methylene bis(cyclohexylisocyanate) and 1,3-xylylene diisocyanate.

While in the successful application of the process of our invention, it is most convenient to use commercial mixtures of meta toluenediamines containing 2,4- and 2,6-meta toluenediamines in an approximate ratio of 4 to 1, as obtained by the reduction of the dinitration products of toluene, other diamines may be successfully used in carrying out the process of our invention. Such useful diamines include meta phenylenediamine, para phenylenediamine, $\alpha,\alpha'$ - xylylenediamine, 4,6-diamino m-xylene, 4,4'-diamino diphenylmethane, 4,4'-diamino-3,3'-dimethyl diphenylmethane, 4,4'-diamino-3,3'-diethyl diphenylmethane, 1,5-naphthylene diamine, 4-methoxy-meta phenylene diamine, 4,4'-diamino diphenyl sulfone, 4,4'-diamino benzophenone, 4,4'-diamino stilbene, 4,4'-diamino diphenylpropane, 4,4'-diamino biphenyl, 4,4'-diamino diphenylether and the like.

The amount of diamine used will vary depending mainly upon the viscosity range and the polyfunctional content desired in the final product, which is determined by the application to which the product is designed. For example, if a polyisocyanate composition of our invention derivde from a toluene-diamine phosgenation product is to be used in the manufacture of low-density rigid urethane foams by the one-shot procedure, it desirably should have a viscosity within the range of 50 to 250 cps. at about 25° C. and a polyisocyanate content corresponding to an amine equivalent of about 100 to about 115. Such a polyisocyanate composition can be obtained by the addition to a degassed and solvent free toluene diamine phosgenation mixture, of a small amount, generally less than 8% of the weight of the phosgenation mixture of a meta toluenediamine mixture in an inert solvent having a boiling point below that of tolylene diisocyanate heating the resulting reaction mixture gradually to a temperature of about 150 to 200° C. and maintaining said mixture at said temperature range for 1 to 5 hours. In a preferred embodiment such a polyisocyanate composition can be obtained by heating the resulting reaction mixture to a temperature within the range of about 160° to 180° C. and maintaining said mixture at this temperature for a period of about 1.5 to 3 hours.

When an undistilled toluenediamine phosgenation mixture is treated by the process of our invention, and as is often the case, such an undistilled mixture contains solid deposits, it has been found preferable, to insure complete and homogeneous distribution of the diamine additive, to heat the undistilled phosgenation mixture, prior to introduction of the diamine additive, to a temperature, generally about 60 to 80° C. sufficient to cause complete solubilization of the solid deposits in the undistilled phosgenation mass.

When a diluent boiling below about 150° C. is used, the diluent may be distilled from the polyisocyanate product prior to or during the heating period. Otherwise the solvent is removed by fractional distillation subsequent to the heating period. If it is desired, for certain applications, to increase the viscosity of the phosgenation product as obtained at this point, a small amount of monomeric tolylene diisocyanates, generally less than 15% of the total product, may be removed at this stage by fractional distillation under vacuum.

In carrying out the process of our invention, the organic diamine additive must be completely dissolved in the inert diluent. The diluent must be sufficiently low boiling to insure its complete separation from the polyisocyanate products without subjecting the latter to excessively high distillation temperatures. Inert diluents, suitable in carrying out the process of our invention, include chloroform, carbon tetrachloride, tetrachloroethane, monochlorobenzene or the dichlorobenzenes, benzene, toluene, hexane, heptane, diisopropyl ether, dibutyl ether, ethylene glycol dimethyl ether, ethyl glycol diethyl ether, cyclohexane, cyclohexanone and the like.

The polyisocyanate compositions of our invention are particularly suitable for the preparation of polyurethane foams having outstanding properties, for example polyurethane foams derived from polyisocyanate compositions prepared by the process of our invention exhibit low thermal conductivities, high compressive strengths and excellent dimensional stability, making such foams particularly desirable for industrial thermal insulation applications.

ISOCYANATE EQUIVALENT WEIGHT OR "AMINE EQUIVALENT"

Isocyanate equivalent weights are measured by an analytical procedure which involves reacting the isocyanate groups in the sample with n-dibutyl amine to form the corresponding urea groups and back titrating excess di-butylamine with HCl solution. The procedure is as follows: weigh 6 to 8 grams of sample, dilute with 35 to 50 cc. of toluene, add 20 cc. of a 2 N solution of di-butylamine in toluene, heat 5 to 10 minutes (do not boil), cool, add 100 cc. methanol, titrate with 1 N HCl solution to an end point pH of 4.2 to 4.5 using a pH meter, run a blank. The results may be calculated as either weight percent NCO group in the sample or as so-called "amine equivalent," i.e., the weight of sample containing 1 equivalent weight (42 grams) of NCO group. The applicable equations are:

Percent NCO=4.2 $(TB-TS)\ N/WS$
AE=1000 $WS/(TB-TS)\ N$ wherein:

AE=amine equivalent
WS=weight of sample in grams
TB=titration of blank in ml. HCl
TS=titration of sample in ml. HCl
N=normality of HCl The following examples illustrate the process of our invention in its preferred form. In the examples parts and percentages are by weight.

Example 1

A solution of 15 parts meta toluenediamine in 150 parts chloroform is added in 6 to 7 minutes to 255 parts distilled tolylene diisocyanate consisting of about 80% 2,4- and about 20%-tolylene diisocyanate during which the temperature of the reaction mixture rises gradually to about 45° C. The reaction mixture is heated in a period of about 3 hours to a temperature of about 170° C. while the solvent is continuously being distilled off. The reaction mixture is maintained at 150 to 170° C. for about 3 hours while final traces of chloroform are being removed. On cooling to room temperature there is obtained 267 parts of a polyisocyanate composition having an amine equivalent of 119 which does not deposit any sediment on prolonged storage.

Example 2

A polyurethane foam is prepared from the polyisocyanate compositon prepared in Example 1, by proceeding in the following manner: A premix is prepared by bringing together 120 parts of "Niax Triol LK-380" (a mixture of polyethers having a hydroxyl number of 375-380, an acid number of less than 1 and a moisture content below 1 percent), 11.3 parts tetra hydroxypropyl-ethylene diamine, 1.1 parts of silicone emulsifier, 0.9 part of dibutyl tin dilaurate and 43 parts trichloromonofluoromethane. A portion of the polyisocyanate composition of Example 1 (114 parts) is cooled to about 15° C. and added to the premix, which is cooled to 20° C. The mixture is agitated for 25 seconds; it expands to maximum volume about 30 seconds later and becomes tack free after an additional 15 seconds. A sample of the foam has a density of 1.9 lbs./cu. ft. and a porosity equivalent to an open cell content of 4.5 percent. For the sample, the compression load at yield point is 30.5 p.s.i. The outstanding dimensional stability of the foam is demonstrated by the following table:

| Test conditions | | | Percent increase | | |
|---|---|---|---|---|---|
| Hours | Temp. | Humidity percent | Height | Length | Width |
| 24 | 70° C | 50 | 0 | 0.5 | 0 |
| 24 | 110° C | 50 | 0 | 1.7 | 3.2 |
| 24 | −30° C | 50 | 0.5 | 0 | |
| 24 | 100° F | 100 | 0.6 | 0 | 1.0 |

Example 3

For the preparation of the polyisocyanate compositions of our invention from undistilled toluenediamine phosgenation mixtures, a solution of commercial toluenediamines in ortho dichlorobenzene, corresponding to a concentration of about 10 percent by weight of toluenediamines, is added to a solution of phosgene in ortho dichlorobenzene, corresponding to a phosgene concentration of 25 percent and to a molar ratio of phosgene to toluenediamine of about 4 to 1 at such a rate that the reaction temperature does not exceed about 20° C. The reaction mixture is then heated in a period of 3 to 4 hours to a final temperature of about 175° C. while phosgene is continuously bubbled in until the evolution of hydrogen chloride gas ceases. The phosgenation mixture is then degassed by a rapid stream of dry nitrogen and the solvent is removed by vacuum distillation at a pressure of about 40 mm. Hg. and a temperature of about 120 to 140° C.

A portion, 2066 parts, of the degassed and essentially solvent-free phosgenation mixture is treated at a temperature of about 100° C., with rapid agitation with a solution of 52 parts meta toluenediamine in 300 parts chloroform. The reaction mixture is heated in 1.5 hours to a temperature of about 170° C. while chloroform is continuously being distilled off. The mixture is maintained at about 170° C. for an additional 1.5 hours while any residual solvent is removed. In this manner, there is obtained in quantitative yield, a polyisocyanate composition having an amine equivalent of 112 and a viscosity of 66 cps. at 25° C.

Example 4

2204 parts of a degassed and essentially solvent-free crude phosgenation mixture prepared according to Example 3 is treated with a solution of 33 parts metatoluenediamine in 214 parts monochlorobenzene in a period of about 20 minutes at an initial temperature of about 170° C. The mixture is maintained at about 170° C. for 1.5 hours after which the monochlorobenzene solvent is removed by fractional distillation at a pressure of 7 to 10 mm. Hg and a distillation temperature of 40 to 50° C. The residue thus obtained has a viscosity of about 34 cps. at 25° C. and an amine equivalent of 105. A portion of this residue, 2006 parts, is fractionally distilled at a pressure of 0.8 to 1.0 mm. Hg. and a distillation temperature of 87 to 90° C. so as to remove as a distillate fraction 255 parts, about 12% of the reaction mixture, of tolylene diisocyanates and to recover, as a residue, 1748 parts of a polyisocyanate composition having a viscosity of 53 cps. at 25° C. and an amine equivalent of 108. There is no indication of the formation of any solid particles in the product after storage for over two months.

Example 5

A solution of 35 parts 4,4'-diamino diphenylmethane in 160 parts monochlorobenzene is added slowly and with efficient agitation to 508 parts of tolylene diisocyanate. During the addition the temperature of the reaction mixture increases gradually from an original temperature of 25° C. to a final temperature of 62° C. The reaction mixture is then heated at about 170° C. for about one hour after which a small amount of monochlorobenzene solvent is distilled off so that the temperature of the reaction mixture increases to about 190 to 195° C. during about an hour. The clear reaction mixture is distilled under vacuum to remove the remainder of the monochorobenzene solvent. There is obtained 535 parts of a liquid polyisocyanate composition having an amine equivalent of about 104, which retains its flow characteristics after storage for 4 months.

We claim:
1. A liquid polyisocyanate composition which on storage is stable with respect to increases in viscosity and does not deposit solid masses obtained by adding to an aromatic or cyclohexyl diisocyanate a solution of an aromatic diamine in an amount of about 0.5 to 8.5% by weight of said diisocyanate in an organic diluent having a boiling point below the boiling point of said diisocyanate, heating said mixture to a temperature within the range of about 150-200° C., maintaining said mixture at a temperature in said temperature range for a period of about 1-5 hours and distilling off said organic diluent to obtain a liquid polyisocyanate composition having a viscosity in the range of 20 to 10,000 cps. at 25° C. and an amine equivalent of about 90 to about 125.

2. A composition as claimed in claim 1 wherein said diisocyanate is tolylene diisocyanate.

3. A composition as claimed in claim 1 wherein said aromatic diamine is meta tolylene diamine.

4. A liquid polyisocyanate composition which on storage is stable with respect to increases in viscosity and does not deposit solid masses obtained by adding to a crude, degassed and essentially solvent-free metatoluenediamine phosgenation mixture, a solution of metatoluenediamine in an amount of about 0.5 to 8.5% by weight of said diisocyanate in an organic diluent having a boiling point below the boiling point of said diisocyanate, heating said mixture to a temperature within the range of about 160-180° C., maintaining said mixture at a temperature in said temperature range for a period of about 1.5-3 hours and distilling off said organic diluent to obtain a liquid polyisocyanate composition having a viscosity in the range of 50 to 250 cps. at 25° C. and an amine equivalent of about 100 to about 115.

5. A process for the production of a liquid polyisocyanate composition which on storage is stable with respect to increases in viscosity and does not deposit solid masses comprising adding to an aromatic or cyclohexyl diisocyanate a solution of an aromatic diamine in an amount equivalent to about 0.5 to 8.5 percent by weight of said diisocyanate in an organic diluent having a boiling point below the boiling point of said diisocyanate, heating said mixture to a temperature in the range of about 150-200° C., maintaining said mixture at a temperature in said temperature range for a period of about 1-5 hours, distilling off said organic diluent, and recovering a liquid polyisocyanate composition having a viscosity in the range of 20 to 10,000 cps. at 25° C. and an amine equivalent of about 90-125.

6. A process as claimed in claim 5 wherein said diisocyanate is an undistilled phosgenation mixture obtained by the phosgenation of tolylene diamine mixtures.

7. A process as claimed in claim 6 wherein the undistilled phosgenation mixture, prior to introduction of the diamine additive is heated to a temperature of about 60° C. to about 80° C. to cause complete solubilization of any solid deposits in the undistilled phosgenation mass.

8. A process as claimed in claim 5 wherein the aromatic diamine is meta toluenediamine.

9. A process as claimed in claim 5 wherein the aromatic diamine is 4,4-diamino diphenylmethane.

10. A process as claimed in claim 5 wherein said diisocyanate is tolylene diisocyanate.

11. A process for the production of a liquid polyisocyanate composition which on storage is stable with respect to increases in viscosity and does not deposit solid masses comprising adding to a crude, degassed and essentially solvent-free metatoluenediamine phosgenation mixture, a solution of metatoluenediamine in an amount equivalent to about 0.5 to 8.5% by weight of said phosgenation mixture in an organic solvent having a boiling point below the boiling point of said phosgenation mixture, heating said mixture to a temperature in the range of about 160 to 180° C. while continuously distilling off said solvent, maintaining said mixture at said temperature range for a period of about 1.5 to 3 hours, removing residual solvent from said mixture by vacuum distillation, then cooling said mixture and recovering a liquid polyisocyanate composition having a viscosity in the range of 50 to 250 cps. at 25° C. and an amine equivalent in the range of about 100 to about 115.

References Cited

UNITED STATES PATENTS

| | | | |
|---|---|---|---|
| 2,597,025 | 5/1952 | Orth | 260—453 X |
| 3,124,605 | 3/1964 | Wagner | 260—453 |
| 3,215,652 | 11/1965 | Kaplan. | |
| 3,282,975 | 11/1966 | Friedman et al. | 260—453 |
| 3,284,479 | 11/1966 | Windemuth et al. | 260—453 |
| 3,317,481 | 5/1967 | Youker | 260—453 X |

FOREIGN PATENTS

| | | |
|---|---|---|
| 883,504 | 7/1953 | Germany. |

OTHER REFERENCES

Losev et al.: Chemical Abstracts, vol. 55, page 25314 (1961).

Wagner: Chemical Abstracts, vol. 59, pages 6406–7 (1963).

CHARLES B. PARKER, Primary Examiner

DOLPH H. TORRENCE, Assistant Examiner

U.S. Cl. X.R.

260—2.5, 77.5

PO-1050
(5/69)

UNITED STATES PATENT OFFICE
CERTIFICATE OF CORRECTION

Patent No. 3,462,470          Dated August 19, 1969

Inventor(s) Ernest W. Emery and Voldemar Kirss

It is certified that error appears in the above-identified patent and that said Letters Patent are hereby corrected as shown below:

Column 7, line 7, "4,4-diamino" should read -- 4,4'-diamino --

SIGNED AND
SEALED
DEC 23 1969

(SEAL)
Attest:

Edward M. Fletcher, Jr.
Attesting Officer

WILLIAM E. SCHUYLER, JR
Commissioner of Patents